United States Patent [19]

Hawkes

[11] 4,005,165

[45] Jan. 25, 1977

[54] METHOD FOR PRODUCING BOOKCOVERS

[75] Inventor: Charles Vivian Hawkes, Leatherhead, England

[73] Assignee: The Research Association for the Paper and Board Printing and Packaging Industries, Leatherhead, England

[22] Filed: July 9, 1975

[21] Appl. No.: 594,362

[30] Foreign Application Priority Data

Feb. 17, 1975 United Kingdom ............... 6584/75

[52] U.S. Cl. ............................... 264/135; 264/129; 264/139; 264/292

[51] Int. Cl.[2] ......................................... B29D 31/00

[58] Field of Search .......... 264/154, 129, 139, 145, 264/163, 291, 292, 135

[56] References Cited

UNITED STATES PATENTS

| | | | |
|---|---|---|---|
| 3,220,544 | 11/1965 | Lovell | 264/292 X |
| 3,350,492 | 10/1967 | Grootenboer | 264/320 |
| 3,470,290 | 9/1969 | Poris | 264/291 |
| 3,489,265 | 1/1970 | Puente | 264/295 X |
| 3,530,213 | 9/1970 | Isle | 264/163 X |
| 3,594,464 | 7/1971 | Ihde | 264/163 |
| 3,900,550 | 8/1975 | Oliver | 264/295 X |

*Primary Examiner*—Richard R. Kucia

*Attorney, Agent, or Firm*—Baldwin, Wight & Brown

[57] ABSTRACT

A method of producing book covers, which method includes cutting at least one elongated notch along the length of one side of a sheet of comparatively rigid plastics having a "memory" (as herein defined) and stretching the plastics defining the floor of the notch to alter its molecular structure so as to provide a readily foldable hinge, said stretching being effected by pressing the plastics defining the floor of the notch outwardly from the notch to raise a ridge on the other side of said sheet.

9 Claims, 11 Drawing Figures

Fig. 10.
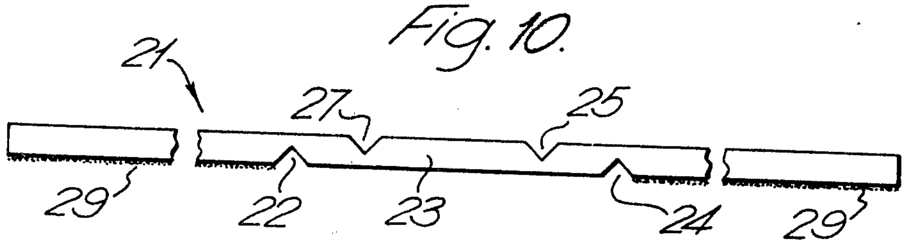
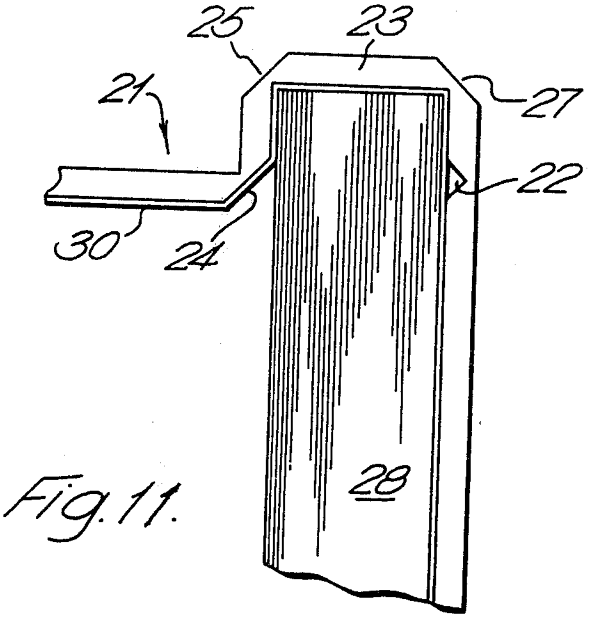
Fig. 11.

METHOD FOR PRODUCING BOOKCOVERS

This invention relates to a method for producing book covers. The term "book covers" is herein defined as covering covers for books, file covers, folders and the like.

U.K. Specification No. 1303214 describes a book cover comprising a sheet of comparatively rigid plastics material wherein a hinge is provided therein between a backboard and a spine, by cutting an elongated notch in the sheet material. There is also disclosed a method of forming a book cover including cutting a pair of elongated notches in a sheet of comparatively rigid plastics material, to form hinges separating backboards from a spine, cutting the sheet to the required size and securing a book to the inner surface of the spine. In order to improve resistance to tearing, the plastics sheet can be left uncut at both ends of the notch for example, over a length equal to twice the thickness of the plastics sheet.

Some plastics have the so-called property of "memory" whereby if, for example, the book cover described above is made from a sheet of such plastics and the sheet is deformed along the notch by bending it there remains a substantial tendency for it to return to its undeformed, i.e. unfolded state. Such "memory" may be overcome by flexing the hinge backwards and forwards many times. This has the effect of orienting the molecules of the plastics in a direction transverse to the line of the hinge and improves the flexibility of the hinge. Examples of plastics having a "memory" include polyolefins, particularly polypropylene and materials consisting mainly of polypropylene.

A book cover as described above may be improved by flexing the hinge backwards and forwards but such a process is difficult to control, time-consuming, and would add to the cost of manufacture.

This invention seeks to provide a method of producing such improved book covers which can be effected more easily by automation and to provide such a method in which deformation can be accurately controlled to achieve optimum performance.

The invention provides a method of producing book covers, which method includes cutting at least one elongated notch along the length of one side of a sheet of comparatively rigid plastics having a "memory" (as herein defined) and stretching the plastics defining the floor of the notch to alter its molecular structure from that in the sheet proper so as to provide a readily foldable hinge, said stretching being effected by pressing the plastics defining the floor of the notch outwardly from the notch to raise a ridge on the other side of said sheet.

Preferably the notch and ridge are formed in one operation by cutting the notch just prior to depressing the floor of the notch into a groove is slightly wider than the width of the ridge. The sheet is suitably held on a grooved platen or base plate during the cutting and stretching operation.

Alternatively, the ridge is formed after cutting the notch by, for example, applying a creasing rule to the notch to form a ridge in the sheet on the side opposite the notch. Alternatively, after cutting the notch, a cylindrical roller having an annular ridge can be applied to the hinge to form the ridge on the other side of the sheet. A roller press may be adapted for this purpose and it has the advantage of allowing continuous deformation of the notch in an extended length of the plastics forming said sheet.

In a method of making a book comprising back boards separated by a spine, a pair of parallel elongated notches are cut in the sheet to define said spine, the material in the floor of each notch is stretched to form said ridge, the sheet is cut to the required size and then a book filler is secured to the inner surface of the spine.

The method of the invention can be used to produce a protective transparent cover for a paperback book. In this case, the sheet of comparatively rigid plastics having a "memory" is transparent and at least a pair of notches are cut in one side of said sheet to define a web therebetween corresponding with the spine of the paperback book. These notches are stretched as before and transparent adhesive is coated on regions of said plastic sheet which are intended to extend over the front and back covers of said paperback book. A removable backing sheet is applied to said adhesively coated regions so that the cover can be handled or stored prior to use. Preferably a second pair of elongated notches are cut along the length of said other side of said sheet adjacent the first pair of notches, the plastics defining the floor or the notches of said second pair also being stretched as before to alter its molecular structure so as to provide a readily foldable hinge. The second pair of notches are parallel to the first to form a quarter-joint cover.

A cover for use with a paperback book is selected so that the width of the web corresponds to the width of the spine of the book. The backing sheet or sheets are removed and the paperback book is pressed onto one side of the adhesively coated cover, for example, with the back in contact with the corresponding adhesive region and the edge of the spine aligned with the corresponding notch of said first pair of notches. The other side of the cover is then folded over the front of the book so that siad web abuts the spine and pressure is applied to cause adhesion between said other side of the book cover and the front of the paperback book. Any surplus portion of the cover i.e. extending beyond the pages of the paperback book, can be trimmed off with a knife or scissors.

Method according to the invention is described with reference to the accompanying drawings in which:

FIG. 10 is an elevational view of a cover for a paperback book, and

FIG. 11 shows an elevational view of the cover of FIG. 9 fitted to a paperback book.

Figure 1:
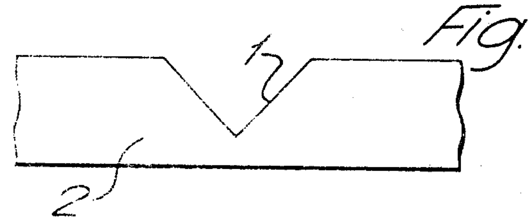
FIG. 1 is an end view of a plastics sheet having a notch therein.
Figure 2:
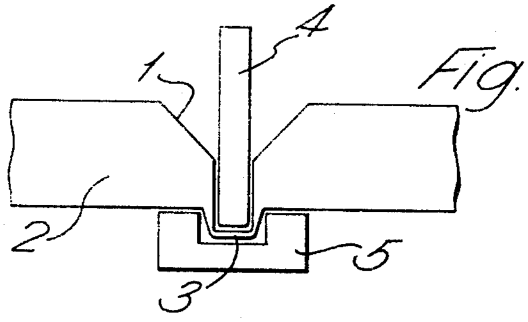
FIG. 2 is a similar view of the sheet showing how the floor of the notch is stretched to raise a ridge on one side of the sheet.
Figure 3:
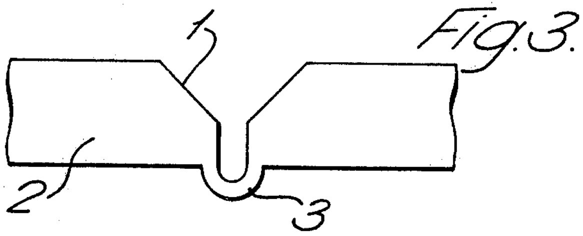
FIG. 3 is a similar view of the sheet showing the resultant deformation of the notch
Figure 4:
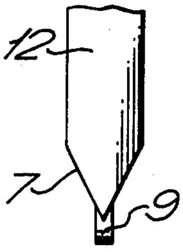
FIG. 4 is an end elevation of a cutter tool for forming a notch in a plastics sheet, showing a part only of a former tool behind it projecting below it.
Figure 5:
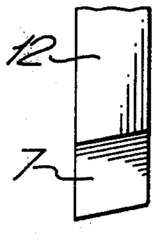
FIG. 5 is an end elevation of the cutter tool only shown in FIG. 4 as viewed at a right angle to FIG. 4.
Figure 6:
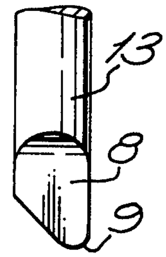
FIG. 6 is an elevation of the former tool.
Figure 7:
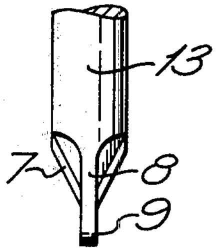
FIG. 7 is an elevation of the former tool as viewed at a right angle to FIG. 6.
Figure 8:
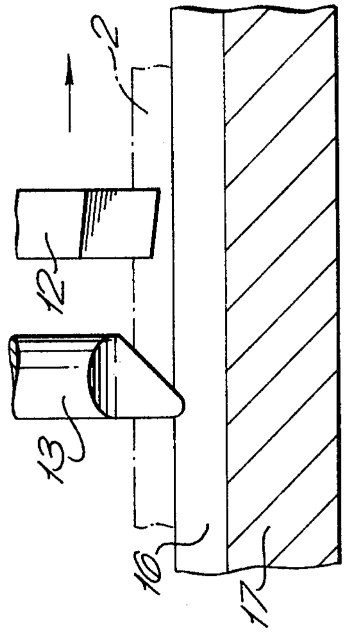
FIG. 8 is a view showing the cutter tool and the former tool in elevation in operating association with a plastics sheet and a grooved platen shown in section.
Figure 9:
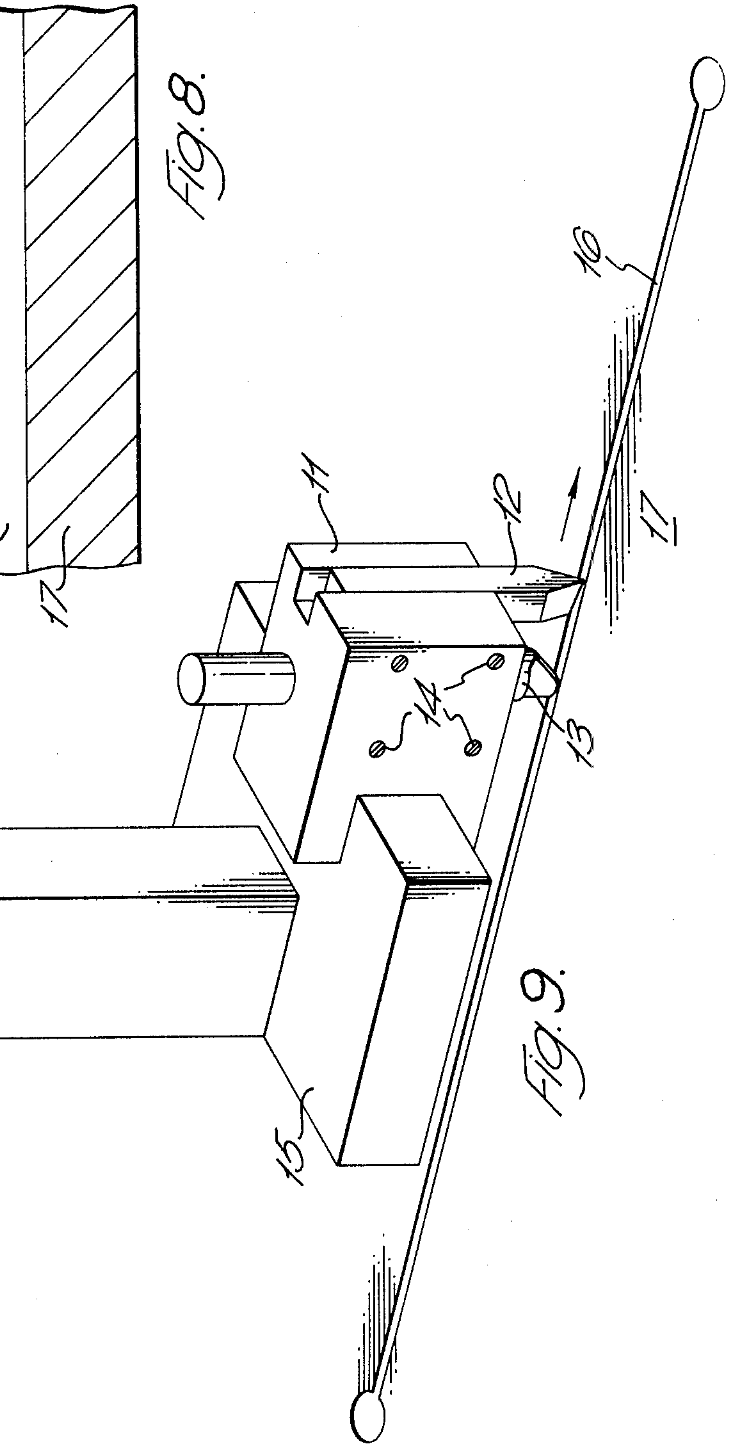
FIG. 9 is a perspective view showing a moveable mounting for the cutter tool and the former tool.

Referring to FIGS. 1–3 of the drawings, a book cover is hinged by cutting elongated notches 1 with portions of reduced thickness (only one of which is shown) in a comparatively rigid sheet of plastics 2, said plastics having a "memory" as defined above. The notches run parallel to, and on either side of the spine throughout the length of the sheet without leaving uncut ends. However, as explained above, uncut ends can be left in the sheet either when using a thin sheet or when the hinges need to be made more resistant to tearing. The notches 1 are preferably V-shaped but other cross-sections could be used. After cutting each notch 1, or during the cutting step as explained below, the plastics defining the floor of each notch is stretched outwardly from the notch and plane of the sheet proper to raise a ridge 3 on the other side of the sheet. This stretching can be done by applying a creasing rule 4 to each notch, the rule 4 closing on a grooved anvil or furniture 5 in for example, a platen press (not shown). The creasing rule 4 presses outwardly, away from the notch, the plastics defining the floor of the notch so as to form a raised ridge 3. During this stretching step, the plastics in the floor of the notch should not be allowed to touch the walls and floor defining the groove in the anvil 5 so as to prevent any compressive deformation between the rule 4 and the anvil 5. The ridges normally project from the inside faces of the book cover and so cannot be seen when the book is closed. Spaced, parallel rules can be provided to deform respective hinges.

Alternatively, use is made of a roller having a raised annular ridge closing against a grooved back plate so as to produce the raised ridge 3. Spaced, circularly parallel ridges can be provided on the roller to form respective hinges.

It is preferred to stretch the floor of the notch during the cutting step and this can be done with a tool as shown in FIGS. 4–9. The tool comprises a cutter 12 having a blade 7 for forming a V-shaped notch and a former 13 having a member 8 for stretching the floor of the notch. Cutter 12 and former 13 are slidably mounted in a block 11 and fixed in position by screws 14. Former 13 is aligned with cutter 12, with respect to advancement of the tool across the sheet, and the tip 9 of member 8 projects below blade 7. The relative positions of tip 9 and blade 7 are such as to produce a ridge in the sheet of the required contour. Means (not shown) are coupled to an arm 15, which supports block 11, to advance the tool transversely across a sheet of plastics having a "memory" whereby the blade 7 ploughs a V-shaped notch in the sheet and the member 8 depresses the floor of the notch into a groove 16 in a platen or baseplate 17 similar to anvil 5 of FIG. 2. The tip 9 of member 8 is profiled to facilitate depression of the floor of the notch and is dimensioned slidably to engage the notch cut by blade 7. Member 8 is thereby guided along the notch. This guiding is important, especially with narrow notches, because it avoids deformation of the walls of the notch caused, for example, by wandering of a "stretching" tool applied to a previously cut notch.

As an alternative, a roller can be provided at the tip 9 of the former. This may be advantageous for high speed operation where a solid tip 9 may become heated due to friction with the floor of the notch. However, a coolant could alternatively be fed to a solid tip 9 to prevent overheating.

The tool shown in FIGS. 4–9 enables more accurate control of the stretching of the floor of the notch. This is especially important with thin sheets of plastics to avoid over-stretching the floor of the notch or even rupture of the groove. By way of an example, when the tool was used to cut and stretch a notch in a sheet of plastics 0.020 inches thick, the minimum thickness of plastics defining the floor of the notch was about 0.005 inches thick (i.e. about ¼ the thickness of the sheet) and the ridge was raised to a height of about 0.010 inches above the side of the sheet opposite the notch (i.e. about ½ the thickness of the sheet). With a thicker sheet, the notch can be made wider and the ridge does not extend so much with respect to the thickness of the sheet. In general, the object is to stretch the floor of the notch to raise a ridge having a substantially uniform thickness extending between the adjacent portions of the plastics sheet.

Means can be provided (not shown) for finely adjusting the position of member 8 relative to blade 7 accurately to form ridges of the required contour.

It will be understood that the above methods are carried out at normal room temperatures and the plastics sheet, member 8 and cutter are not heated.

A release agent can be coated on a sheet adjacent parallel hinges, i.e. along an inner strip on the inside of the front and back covers of a book, to prevent adherence of adhesives used in securing the spine of bound signature to the corresponding spine portion of the cover.

Referring to FIG. 10, a cover 21 for a paperback book is made from a sheet of transparent plastics having a "memory" (as herein defined), in which notches 22, 24 are cut in one major surface and notches 25, 27 are cut in the other major surface. A web 23 between notches 25, 27 is of the same width as the spine of a paperback book 28.

The floor of each notch is deformed by stretching the plastics material, as described above, by pressing the plastics defining the floor of each notch outwardly from the notch to raise a ridge on the other side of the sheet so as to provide readily foldable hinges.

An adhesive coating 19 is applied on regions of the major surface containing notches 22, 24, which regions extend at least between the notches 22, 24 and the edges of the cover 21. A removable backing sheet (not shown) is attached to the adhesive coating whereby the covers may be handled until required for use to cover a paperback book.

FIG. 11 shows a cover 21 attached to a paperback book 28, showing the front page of the book 30 folded away from the main body of the book 28.

What we claim is:

1. A method of producing book covers, which method includes cutting at least one elongated notch along the length of one side of a sheet of comparatively semi-rigid plastics material having a tendency to return to its undeformed state after having been deformed by folding along the notched part of said sheet, and stretching the plastics defining the floor of the notch to alter its molecular structure so as to provide a readily foldable hinge, said stretching being effected by pressing the plastics defining the floor of the notch outwardly from the notch to raise a ridge on the other side of said sheet.

2. A method according to claim 1 wherein the notch and ridge are formed in one operation by cutting the notch just prior to depressing the floor of the notch into a groove in a platen or baseplate on which said sheet is supported, said groove being slightly wider than the width of said ridge.

3. A method according to claim 2 wherein the notch is cut, and the ridge is formed, by a tool comprising a blade spaced from a former member for stretching the floor of the notch, the tool being advanced transversely across said sheet, said former member being guided by slidably engaging the notch cut by the blade.

4. A method according to claim 1 wherein the floor of the notch is depressed by a creasing rule which closes on a groove in a platen or baseplate on which said sheet is supported, said groove being slightly wider than the width of said ridge.

5. A method according to claim 1 wherein the floor of the notch is depressed by a roller having a circumferential ridge, said sheet being supported on a platen or baseplate having a groove therein for cooperating with the ridge on the roller, said groove being slightly wider than the width of said ridge.

6. A method according to claim 1 wherein the notch is V-shaped.

7. A method according to claim 1 wherein the notch is cut in said sheet to a depth of substantially ¾ of the thickness of the sheet and the ridge is raised to a height of substantially ½ of the thickness of the sheet.

8. A method according to claim 1 wherein said sheet of comparatively rigid plastics is transparent and a first pair of notches are cut in one side of said sheet to define a web therebetween corresponding with the spine of a paperback book, the notches being stretched to raise respective ridges on the other side of said sheet, the method including the step of coating a transparent adhesive on regions of said sheet which are intended to extend over the front and back covers of said paperback book, and applying a removable backing sheet to the adhesively coated regions.

9. A method according to claim 8 wherein a second pair of elongated notches are cut on the other side of the sheet, parallel to the first pair of notches, to form a quarterjoint cover, the second pair of notches being stretched to raise respective ridges on said one side of said sheet.

* * * * *